(12) United States Patent
Graf et al.

(10) Patent No.: US 11,605,532 B2
(45) Date of Patent: Mar. 14, 2023

(54) METHOD AND ION GUIDE ASSEMBLY FOR MODULATING A STREAM OF IONS

(71) Applicant: TOFWERK AG, Thun (CH)

(72) Inventors: Stephan Graf, Heimberg (CH); Michael Kamrath, Thun (CH); Sebastian Gerber, Thun (CH)

(73) Assignee: TOFWERK AG, Thun (CH)

( * ) Notice: Subject to any disclaimer, the term of this patent is extended or adjusted under 35 U.S.C. 154(b) by 133 days.

(21) Appl. No.: 17/332,810

(22) Filed: May 27, 2021

(65) Prior Publication Data

US 2022/0384172 A1 Dec. 1, 2022

(51) Int. Cl.
*H01J 49/00* (2006.01)
*H01J 49/06* (2006.01)
(Continued)

(52) U.S. Cl.
CPC .......... *H01J 49/065* (2013.01); *G01N 27/622* (2013.01); *H01J 49/025* (2013.01)

(58) Field of Classification Search
CPC ........ H01J 49/004; H01J 49/06; H01J 49/065; H01J 49/26; H01J 49/0036; H01J 49/0031;
(Continued)

(56) References Cited

U.S. PATENT DOCUMENTS

| 8,835,839 B1 | 9/2014 | Anderson et al. |
| 2004/0031920 A1 | 2/2004 | Giles |
| 2017/0212081 A1* | 7/2017 | Green .................. H01J 49/004 |

FOREIGN PATENT DOCUMENTS

| EP | 1367633 A2 | 12/2003 |
| EP | 3561853 A1 | 10/2019 |

(Continued)

OTHER PUBLICATIONS

Clowers et al., "Masked Mulitplexed Separations to Enhance Duty Cycle for Structures for Lossless Ion Manipulations," Analytical Chemistry, vol. 93, No. 14, Apr. 2, 2021, pp. 5727-5734 (20 pages total).

(Continued)

*Primary Examiner* — David E Smith
*Assistant Examiner* — Hsien C Tsai
(74) *Attorney, Agent, or Firm* — Birch, Stewart, Kolasch & Birch, LLP

(57) ABSTRACT

The invention relates to a method for, in an ion guide (10), modulating a stream of ions according to a modulation function, wherein the stream of ions includes at least N different ion species, wherein N is at least 1. This ion guide (10) forms an ion guide path, wherein the ions of the stream of ions are conveyed along the ion guide path in a conveying direction to form the stream of ions. The ion guide (10) includes an ion gate (12) arranged at an ion gate position on the ion guide path, wherein the ion gate (12) is adapted to provide an open state for allowing the ions passing the ion gate position when being conveyed along the ion guide path and a closed state for preventing the ions from passing the ion gate position. The ion guide (10) further includes a first arrangement (13) of conveying electrodes (230) arranged along the ion guide path, the first arrangement (13) of conveying electrodes (230) extending over a first section of the ion guide path, wherein the first section of the ion guide path reaches from at least the ion gate position downstream to at least a transition position on the ion guide path, wherein the first arrangement (13) of conveying electrodes (230) is adapted for generating first travelling waves having a first travelling wave amplitude and travelling along the first (Continued)

section of the ion guide path at a first travelling wave velocity for conveying the ions along the first section of the ion guide path. Furthermore, the ion guide (10) includes a second arrangement (14) of conveying electrodes (240) arranged along the ion guide path, the second arrangement (14) of conveying electrodes (240) extending over a second section of the ion guide path, wherein the second section of the ion guide path reaches from the transition position downstream, wherein the second arrangement (14) of conveying electrodes (240) is adapted for generating second travelling waves having a second travelling wave amplitude and travelling along the second section of the ion guide path at a second travelling wave velocity for conveying the ions along the second section of the ion guide path. According to the method, the stream of ions is modulated with the ion gate (12) according to the modulation function and AC voltages are applied to the first arrangement (13) of conveying electrodes (230) for generating the first travelling waves and to the second arrangement (14) of conveying electrodes (240) for generating the second travelling waves for conveying the ions downstream of the ion gate (12) along the first section and the second section of the ion guide path in the conveying direction away from the ion gate (12), wherein for each ion species of the at least N different ion species, a ratio A is the average velocity of the ions of the respective ion species in the first section of the ion guide path divided by the first travelling wave velocity, wherein for each ion species of the at least N different ion species, a ratio B is the average velocity of the ions of the respective ion species in the second section of the ion guide path divided by the second travelling wave velocity, wherein the first travelling wave amplitude, the first travelling wave velocity, the second travelling wave amplitude and the second travelling wave velocity are chosen such that for each ion species of the at least N different ion species, the ratio A is larger than the ratio B.

20 Claims, 2 Drawing Sheets

(51) Int. Cl.
*H01J 49/02* (2006.01)
*G01N 27/622* (2021.01)
(58) Field of Classification Search
CPC ............... H01J 49/0054; H01J 49/0072; H01J 49/0077; H01J 49/062; G01N 27/622; G01N 27/623
See application file for complete search history.

(56) References Cited

FOREIGN PATENT DOCUMENTS

WO WO 2018/037240 A1 3/2018
WO WO 2021/053342 A1 3/2021

OTHER PUBLICATIONS

Li et al., "Ion Mobility Spectrometry with High Ion Utilization Efficiency Using Traveling Wave-Based Structures for Lossless Ion Manipulations," Analytical Chemistry, vol. 92, No. 22, Oct. 26, 2020, pp. 14930-14938 (13 pages total).
Extended European Search Report dated Nov. 3, 2021 for Application No. 21176300.8.
Giles et al., "Enhancements in travelling wave ion mobility resolution", Rapid Commun. Spectrom, vol. 25, 2011, pp. 1559-1566 (8 pages total).

* cited by examiner

METHOD AND ION GUIDE ASSEMBLY FOR MODULATING A STREAM OF IONS

TECHNICAL FIELD

The invention relates to a method for, in an ion guide, modulating a stream of ions according to a modulation function. The invention further relates to an ion guide assembly for modulating a stream of ions according to a modulation function with the method according to the invention.

BACKGROUND ART

Methods and ion guide assemblies for conveying ions along an ion guide path in a conveying direction are known. EP 1 367 633 A2 of Micromass Limited for example discloses an ion guide assembly for conveying ions along an ion guide path in a conveying direction. The ion guide of this ion guide assembly comprises a plurality of electrodes. For conveying the ions along the ion guide path, a sequence of DC voltages is applied to each one of the electrodes. Thus, a DC potential waveform is generated along the ion guide path. This DC potential waveform is seen by the ions as a DC potential well which moves in conveying direction along the ion guide path. In case such an ion guide assembly is employed in ion mobility spectrometry, the ions ride on or with the travelling DC potential wells that are being translated along the ion guide path. Since there is a neutral gas in the ion guide, ions may however be pushed out of a travelling DC potential well by the resistance of the neutral gas. Such ions are then trapped by the succeeding travelling DC potential well. There, the ions may again be pushed out of the travelling DC potential well and again be trapped by the succeeding travelling DC potential well. In such an ion guide assembly, the larger the collision cross section of an ion is, the higher is the probability for the ion to be pushed out of a travelling DC potential well. Consequently, larger ions take longer to traverse a given distance. Therefore, the mobility of the ions can be calculated based on the time they require to traverse a given distance.

Another example of a method and ion guide assembly for conveying ions along an ion guide path in a conveying direction is described in EP 3 561 853 A1 of Tofwerk AG. Here, the ion guide comprises at least three conveying electrodes arranged in a succession of each other along the ion guide path. Thereby, a radio frequency AC voltage control circuitry is connected to the at least three conveying electrodes for supplying each of the at least three conveying electrodes with a radio frequency AC voltage, wherein for each one of the at least three conveying electrodes which is succeeding in the succession of the at least three conveying electrodes a preceding neighbouring conveying electrode of the at least three conveying electrodes, the radio frequency AC voltage has essentially a same frequency, essentially a same maximum amplitude and a phase increased by an amount in a range from 10° to 170° as compared to for the respective preceding neighbouring conveying electrode for generating a radio frequency AC potential wave along the ion guide path moving in the conveying direction for conveying the ions along the ion guide path in the conveying direction.

U.S. Pat. No. 8,835,839 B1 of Battelle Memorial Institute discloses further methods and ion guide assemblies for conveying ions along an ion guide path in a conveying direction. In this example, the device includes a pair of substantially parallel surfaces. An array of inner electrodes is contained within each parallel surface and extends substantially along the length of each parallel surface. The device further includes a first outer array of electrodes and a second outer array of electrodes. Each outer array of electrodes is positioned on either side of the inner electrodes, and is contained within and extends substantially along the length of each parallel surface. A DC voltage is applied to the first and second outer array of electrodes and an RF voltage with a superimposed electric field is applied to the inner electrodes by applying the DC voltages to each electrode. In this arrangement the ions either move between the parallel surfaces within an ion confinement area or along paths in the direction of the electric field, or can be trapped in the ion confinement area. Thereby, U.S. Pat. No. 8,835,839 B1 of Battelle Memorial Institute shows simulation calculations where the movements of the ions in the device are simulated.

These methods and ion guide assemblies described in EP 1 367 633 A2 of Micromass Limited, EP 3 561 853 A1 of Tofwerk AG and U.S. Pat. No. 8,835,839 B1 of Battelle Memorial Institute can be used for ion mobility spectrometry as mentioned in these documents.

In known methods and apparatuses for determining a mobility of ions, the mobility of the ions is determined by determining the time the ions require to pass through an ion mobility separation cell. In order to determine this time, a stream of ions is modulated according to a modulation function and then passed through the ion mobility separation cell, whereafter the ions are detected with an ion detector. Thereby, essentially two different modes for determining the mobility of the ions are known.

In the first mode, the modulation function consists of regular or irregular pulses with pauses in between which are enough long such that the slowest ions of a particular pulse arrive at the ion detector before the fastest ions of the subsequent pulse arrive at the ion detector in order to be able to assign the detected ions to a particular pulse. Thus, in this case, the time difference between the pulse and the arrival of the ions at the ion detector is directly related to the mobility of the ions. Therefore, by knowing the gas pressure in the ion mobility separation cell, the mobility of the ions can be determined from the time difference between the pulse and the arrival of the ions at the ion detector.

In the second mode, the modulation function provides pulses of identical or varying width in time and varying gaps between the pulses which are relatively short such that the slowest ions of a particular pulse may arrive at the ion detector after the fastest ions of the subsequent pulse have arrived at the ion detector. In this case, the measurement can be multiplexed in that the modulation function is chosen to have an autocorrelation which is a two-valued function. This means that the autocorrelation function has a peak at one value like for example at zero and a constant value at all other values. In this case, the mobility of the ions is obtained by calculating the correlation of the modulation function and the signal obtained from the ion detector. This correlation provides in the first place the time distribution of the ions required for passing the ion mobility separation cell. However, the mobility of the ions can be determined from the time distribution by scaling as known in the art, for example by knowing the gas pressure in the ion mobility separation cell or by instrument calibration.

In both modes, the accuracy of the determined mobility of ions depends strongly on the width and shape of the pulses of the ions which are inserted into the ion mobility separation cell. Thus, the accuracy of the determined mobility of ions depends strongly on how precisely the stream of ions is modulated according to the modulation function. In particular when the measurement is multiplexed, distortions in the shape of the pulses of the ions that are inserted into the ion mobility separation cell lead to artificial features in the obtained ion mobility spectra which can mistakenly be understood as ions having a certain mobility corresponding to the position of these artificial features in the obtained ion mobility spectra.

One way to improve the shape of the ion pulses is to incorporate the ion gate into the ion guide. One such example, where the ion guide includes an ion gate for modulating a stream of ions according to a modulation function for performing ion mobility spectrometry is described in the article "*Masked Multiplexed Separations to Enhance Duty Cycle for Structures for Lossless Ion Manipulations*" of Brian H. Clowers et al., Analytical Chemistry, 2021, 93, 14, 5727-5734. However, this solution still leaves a lot of space for improving the preciseness with which the stream of ions is modulated according to the modulation function.

Whenever the mobility of ions should be determined in high accuracy, the known methods for, in an ion guide, modulating a stream of ions according to a modulation function and the known ion guide assemblies for modulating a stream of ions according to a modulation function do not enable modulating the stream of ions precise enough according to the respective modulation function.

SUMMARY OF THE INVENTION

It is the object of the invention to create a method and an ion guide assembly pertaining to the technical field initially mentioned, that enable modulating a stream of ions more precisely according to a modulation function in an ion guide.

The solution of the invention is specified by the features of claim 1. According to the invention in the method for, in an ion guide, modulating a stream of ions according to a modulation function, the stream of ions includes at least N different ion species, wherein N is at least 1. Thereby, the ion guide forms an ion guide path, wherein the ions of the stream of ions are conveyed along the ion guide path in a conveying direction to form the stream of ions. The ion guide includes an ion gate arranged at an ion gate position on the ion guide path, wherein the ion gate is adapted to provide an open state for allowing the ions passing the ion gate position when being conveyed along the ion guide path and a closed state for preventing the ions from passing the ion gate position. The ion guide further includes a first arrangement of conveying electrodes arranged along the ion guide path, the first arrangement of conveying electrodes extending over a first section of the ion guide path, wherein the first section of the ion guide path reaches from at least the ion gate position downstream to at least a transition position on the ion guide path, wherein the first arrangement of conveying electrodes is adapted for generating first travelling waves having a first travelling wave amplitude and travelling along the first section of the ion guide path at a first travelling wave velocity for conveying the ions along the first section of the ion guide path. The ion guide furthermore includes a second arrangement of conveying electrodes arranged along the ion guide path, the second arrangement of conveying electrodes extending over a second section of the ion guide path, wherein the second section of the ion guide path reaches from the transition position downstream, wherein the second arrangement of conveying electrodes is adapted for generating second travelling waves having a second travelling wave amplitude and travelling along the second section of the ion guide path at a second travelling wave velocity for conveying the ions along the second section of the ion guide path. Thereby, according to the method, the stream of ions is modulated with the ion gate according to the modulation function and AC voltages are applied to the first arrangement of conveying electrodes for generating the first travelling waves and to the second arrangement of conveying electrodes for generating the second travelling waves for conveying the ions downstream of the ion gate along the first section and the second section of the ion guide path in the conveying direction away from the ion gate. Thereby, for each ion species of said at least N different ion species, a ratio A is the average velocity of the ions of the respective ion species in the first section of the ion guide path divided by the first travelling wave velocity, wherein for each ion species of the at least N different ion species, a ratio B is the average velocity of the ions of the respective ion species in the second section of the ion guide path divided by the second travelling wave velocity, wherein the first travelling wave amplitude, the first travelling wave velocity, the second travelling wave amplitude and the second travelling wave velocity are chosen such that for each ion species of the at least N different ion species, the ratio A is larger than the ratio B.

According to the invention, the ion guide assembly for modulating a stream of ions according to a modulation function with the method according to the invention, wherein the stream of ions includes at least N different ion species, wherein N is at least 1, includes an ion guide which forms an ion guide path, wherein the ions of the stream of ions are conveyable along the ion guide path in a conveying direction to form the stream of ions. Thereby, the ion guide includes an ion gate arranged at an ion gate position on the ion guide path, wherein the ion gate is adapted to provide an open state for allowing the ions passing the ion gate position when being conveyed along the ion guide path and a closed state for preventing the ions from passing the ion gate position. The ion guide further includes a first arrangement of conveying electrodes arranged along the ion guide path, the first arrangement of conveying electrodes extending over a first section of the ion guide path, wherein the first section of the ion guide path reaches from at least the ion gate position downstream to at least a transition position on the ion guide path, wherein the first arrangement of conveying electrodes is adapted for generating first travelling waves having a first travelling wave amplitude and travelling along the first section of the ion guide path at a first travelling wave velocity for conveying the ions along the first section of the ion guide path. The ion guide furthermore includes a second arrangement of conveying electrodes arranged along the ion guide path, the second arrangement of conveying electrodes extending over a second section of the ion guide path, wherein the second section of the ion guide path reaches from the transition position downstream, wherein the second arrangement of conveying electrodes is adapted for generating second travelling waves having a second travelling wave amplitude and travelling along the second section of the ion guide path at a second travelling wave velocity for conveying the ions along the second section of the ion guide path. Thereby, the ion guide assembly includes at least one AC voltage control circuitry connectable to the first arrangement of conveying electrodes for supplying the conveying electrodes of the first arrangement of conveying electrodes with AC voltages for generating the first travelling waves for conveying the ions downstream of the ion gate along the first section of the ion guide path in the conveying direction away from the ion gate and connectable to the second arrangement of conveying electrodes for supplying the conveying electrodes of the second arrangement of conveying electrodes with AC voltages for generating the second travelling waves for conveying the ions along the second section of the ion guide path in the conveying direction away from the ion gate. Thereby, for each ion species of the at least N different ion species, a ratio A is the average velocity of the ions of the respective ion species in the first section of the ion guide path divided by the first travelling wave velocity, wherein for each ion species of the at least N different ion species, a ratio B is the average velocity of the ions of the respective ion species in the second section of the ion guide path divided by the second travelling wave velocity, wherein the ion guide assembly includes a control unit adapted to control the ion guide assembly such that the first travelling wave amplitude, the first travelling wave velocity, the second travelling wave amplitude and the second travelling wave velocity are chosen such that for each ion species of the at least N different ion species, the ratio A is larger than the ratio B. Thus, when executing the method according to the invention, the ion guide assembly is advantageously controlled with the control unit of the ion guide assembly such that the first travelling wave amplitude, the first travelling wave velocity, the second travelling wave amplitude and the second travelling wave velocity are chosen such that for each ion species of the at least N different ion species, the ratio A is larger than the ratio B.

According to the invention, the stream of ions includes at least N different ion species, wherein N is at least 1. Thus, the stream of ions includes ions of the at least N different ions species, but may include further ions of other ion species, too. Thereby, the precise number of ion species of which there are ions in the stream of ions is not needed to be known. In an example, all ion species obtained from a sample with a mass-to-charge ratio larger than a certain threshold can be considered as belonging to the at least N different ion species. In another example, all ion species obtained from a sample with a mobility larger than a certain threshold can be considered as belonging to the at least N different ion species. Thus, the stream of ions is advantageously formed from a sample including analytes which are atoms and/or compounds of interest, wherein these analytes belong to the N different ion species when being ionised to ions.

According to the invention, the ions of the stream of ions are conveyed along the ion guide path in a conveying direction to form the stream of ions. Thereby, the ion guide path is preferably a spatial region, wherein the ions move within the spatial region of the ion guide path when being conveyed along the ion guide path in the conveying direction. Since the conveying direction follows the course of the ion guide path and since the ion guide path does not necessarily follow a straight line but may comprise bends and curves, the conveying direction may change in space depending on the position where one looks at the ion guide path. Thus, the conveying direction indicates at each position of the ion guide path the direction along the ion guide path of the stream of ions. Thus, the wording downstream of a particular position on the ion guide path refers to starting from the respective particular position in the conveying direction, while the wording upstream of a particular position on the ion guide path refers to starting from the respective particular position in the opposite of the conveying direction.

Advantageously, the ion guide has a first end, which is also referred to as entrance end of the ion guide, and a second end, which is also referred to as exit end of the ion guide, being spatially separated from the first end, for conveying the ions of the stream of ions along the ion guide path from a first spatial region located in an area of the first end of the ion guide to a second spatial region located in an area of the second end of the ion guide. In this case, the ion guide path is preferably a spatial region connecting the first spatial region to the second spatial region, wherein the ions move within the spatial region of the ion guide path when being conveyed along the ion guide path in the conveying direction from the first spatial region to the second spatial region. Thus, the conveying direction indicates at each position of the ion guide path the direction along the ion guide path from the first spatial region to the second spatial region.

The ions of the ion stream do not necessarily always move only in the conveying direction along the ion guide path. There may be moments where an ion moves perpendicular to the conveying direction or even countermoves the conveying direction. There is however a net movement of the ions along the ion guide path in the conveying direction. As an example for a movement of the ions not exclusively in the conveying direction, the ions can move in small circles while being conveyed along the ion guide path in the conveying direction.

Since the ions of the ion stream do not necessarily always move only in the conveying direction along the ion guide path but show complex pattern of movements, the term average velocity of the ions in the first section of the ion guide path relates to the net movement of the ions along the first section of the ion guide path in the conveying direction and thus means the net movements average velocity of the ions in the first section of the ion guide path. In the same sense, the term average velocity of the ions in the second section of the ion guide path relates to the net movement of the ions along the second section of the ion guide path in the conveying direction and thus means the net movements average velocity of the ions in the second section of the ion guide path. Consequently, the average velocity of an ion of a particular ion species in the first section and in the second section of the ion guide path can be determined by measuring the time the respective ion requires to pass a certain distance in the respective one of the first and second section of the ion guide path. Such an experimental determination of the average velocity may as well be obtained by constructing an experimental ion guide having the same properties as the first or second section of the ion guide path, respectively, and measuring the time the respective ion requires to pass a certain distance in this experimental ion guide. Even calculated simulations of the ions movement in the respective one of the first and second section of the ion guide path can be used to determine the average velocity of the respective ion with a reasonable precise accuracy provided the modelling used for the calculated simulation is sufficient accurate.

According to the invention, the ion guide includes an ion gate arranged at an ion gate position on the ion guide path. How this ion gate is precisely formed, is irrelevant Important is that the ion gate is adapted to provide an open state for allowing the ions passing the ion gate position when being conveyed along the ion guide path and a closed state for preventing the ions from passing the ion gate position when being conveyed along the ion guide path in order to enable modulating the stream of ions with the ion gate according to the modulation function. In one preferred example, the ion gate is formed of one or more ion gate electrodes on which a blocking voltage can be applied for switching and maintaining the ion gate in the closed state, wherein the ion gate is switched to the open state when the applied blocking voltage is reduced or turned off. Such an ion gate can be formed by one or more separate ion gate electrodes in the ion guide or can be formed by a set of one or more conveying electrodes of the ion guide. In this latter case, the one or more ion gate electrodes are at the same time conveying electrodes like the ion gate used in the study published in the article "*Masked Multiplexed Separations to Enhance Duty Cycle for Structures for Lossless Ion Manipulations*" of Brian H. Clowers et al., Analytical Chemistry, 2021, 93, 14, 5727-5734. In either case, the ion guide assembly advantageously includes a gate voltage control circuitry for applying the blocking voltage to the one or more ion gate electrodes. Advantageously, this gate voltage control circuitry is connected to the one or more ion gate electrodes for applying the blocking voltage to the one or more ion gate electrodes. Independent of the type ion gate, the stream of ions is advantageously modulated with the ion gate according to the modulation function by switching the ion gate between the closed state and the open state according to the modulation function.

As mentioned, the first section of the ion guide path reaches from at least the ion gate position downstream to at least a transition position on the ion guide path. Thereby, the first section of the ion guide path advantageously ends in a downstream end at the transition position. In a variant however, the downstream end of the first section of the ion guide path is downstream of the transition position. In this case, the first section of the ion guide path and the second section of the ion guide path overlap.

According to the invention, the first arrangement of conveying electrodes is adapted for generating first travelling waves having a first travelling wave amplitude and travelling along the first section of the ion guide path at a first travelling wave velocity for conveying the ions along the first section of the ion guide path. Particular preferably, the first arrangement of conveying electrodes is adapted for generating the first travelling waves travelling along the entire first section of the ion guide path at the first travelling wave velocity for conveying the ions along the first section of the ion guide path.

According to the invention, the ion guide includes a second arrangement of conveying electrodes arranged along the ion guide path, the second arrangement of conveying electrodes extending over a second section of the ion guide path, wherein the second section of the ion guide path reaches from the transition position downstream. Preferably, the second section of the ion guide path has a downstream end which is located downstream of the transition position.

According to the invention, the second arrangement of conveying electrodes is adapted for generating second travelling waves having a first travelling wave amplitude and travelling along the second section of the ion guide path at a second travelling wave velocity for conveying the ions along the second section of the ion guide path. Particular preferably, the second arrangement of conveying electrodes is adapted for generating the second travelling waves travelling along the entire second section of the ion guide path at the travelling wave velocity for conveying the ions along the second section of the ion guide path.

In case the first section of the ion guide path ends in its downstream end at the transition position, the second section of the ion guide path advantageously joins the first section of the ion guide path on the downstream end of the first section of the ion guide path. In case the first section of the ion guide path ends in its downstream end downstream of the transition position, however, the first section and the second section of the ion guide path overlap from the transition position downstream until the downstream end of the first section of the ion guide path.

Advantageously, the first travelling waves and the second travelling waves are in phase at the transition position. In a variant, however, the first travelling waves and the second travelling waves are sometimes or always during executing the method according to the invention at the transition position out of phase.

According to the invention, the AC voltages are applied to the first arrangement of conveying electrodes for generating the first travelling waves and to the second arrangement of conveying electrodes for generating the second travelling waves for conveying the ions downstream of the ion gate along the first section and the second section of the ion guide path in the conveying direction away from the ion gate. Advantageously, the AC voltages follow a periodic curve. This periodic curve is not required to pass through zero. It can be superposed with a constant DC-voltage and thus be shifted relative to ground or not. Particular advantageously, the AC voltages follow a sine curve. In an alternative however, the AC voltages follow a periodic curve which is different from a sine curve. Thereby, the periodic curve may be a continuously differentiable curve or may be a curve providing kinks and thus provide positions where it is not differentiable. The AC voltages may thus for example be periodical, rectangular shaped DC voltage pulses.

Independent of the shape of the AC voltages, the same AC voltages can be applied to the first arrangement of conveying electrodes for generating the first travelling waves and to the second arrangement of conveying electrodes for generating the second travelling waves for conveying the ions downstream of the ion gate along the first section and the second section of the ion guide path in the conveying direction away from the ion gate. In a variant however, the AC voltages applied to the first arrangement of conveying electrodes for generating the first travelling waves differ from the AC voltages applied to the second arrangement of conveying electrodes for generating the second travelling waves or conveying the ions downstream of the ion gate along the first section and the second section of the ion guide path in the conveying direction away from the ion gate.

Preferably, with the conveying electrodes of the first arrangement of the conveying electrodes and the second arrangement of the conveying electrodes, when supplied with the AC voltages, an electric field is generatable having a maximum strength in a range between 1 V/mm and 5'000 V/mm.

In a first preferred variant, AC voltages applied to the second arrangement of conveying electrodes are radio frequency AC voltages. Thereby, in a first preferred variant, the AC voltages applied to the first arrangement of conveying electrodes are preferably radio frequency AC voltages, too. In a second preferred variant, however, the AC voltages applied to the first arrangement of conveying electrodes are not radio frequency AC voltages. In this case, the AC voltages applied to the first arrangement of conveying electrodes advantageously have a frequency in the range from 1 kHz to 100 kHz. In variants, however, the frequencies of the AC voltages are smaller or higher than this range. In an in yet another preferred variant, the AC voltages applied to the second arrangement of conveying electrodes are not radio frequency AC voltages. In this case, the AC voltages applied to the first arrangement of conveying electrodes are advantageously not radio frequency AC voltages either. In this case, the AC voltages applied to the first arrangement of conveying electrodes and the AC voltages applied to the second arrangement of conveying electrodes advantageously have a frequency in the range from 1 kHz to 100 kHz. In variants, however, the frequencies of the AC voltages are smaller or higher than this range.

In the present text, radio frequency AC voltages preferably have a frequency of 100 kHz or more, preferably 250 kHz or more, particular preferably 500 kHz or more. Advantageously, the radio frequency AC voltages have a frequency in a range from 100 kHz to 50 MHz, from 250 kHz to 50 MHz, or from 500 kHz to 50 MHz.

As mentioned, the ion guide assembly includes at least one AC voltage control circuitry connectable to the first arrangement of conveying electrodes for supplying the conveying electrodes of the first arrangement of conveying electrodes with AC voltages for generating the first travelling waves for conveying the ions downstream of the ion gate along the first section of the ion guide path in the conveying direction away from the ion gate and connectable to the second arrangement of conveying electrodes for supplying the conveying electrodes of the second arrangement of conveying electrodes with AC voltages for generating the second travelling waves for conveying the ions along the second section of the ion guide path in the conveying direction away from the ion gate. Thus, for operating the ion guide assembly, the at least one AC voltage control circuitry is advantageously connected to the first arrangement of conveying electrodes for supplying the conveying electrodes of the first arrangement of conveying electrodes with AC voltages for generating the first travelling waves for conveying the ions downstream of the ion gate along the first section of the conveying path in the conveying direction away from the ion gate and connected to the second arrangement of conveying electrodes for supplying the conveying electrodes of the second arrangement of conveying electrodes with AC voltages for generating the second travelling waves for conveying the ions along the second section of the ion guide path in the conveying direction away from the ion gate. Therefore, advantageously, the above mentioned AC voltages are applied to the conveying electrodes of the first arrangement of conveying electrodes and to the conveying electrodes of the second arrangement of conveying electrodes by the at least one AC voltage control circuitry of the ion guide assembly when executing the method.

The at least one AC voltage control circuitry can be one for both the first and the second arrangement of conveying electrodes or can be one for the first arrangement of conveying electrodes and another one for the second arrangement of conveying electrodes.

Each one of the at least one AC voltage control circuitry may for example be a board, a permanent wiring or be printed on a circuit board. In an example, the AC voltage control circuitry comprises one or more power supplies which can each be an AC power supply or a DC power supply. In another example however, the AC voltage control circuitry is connectable to one or more separate power supplies which can again each be an AC power supply or a DC power supply. Independent of whether the AC voltage control circuitry comprises one or more power supplies or whether the AC voltage control circuitry is connectable to one or more separate power supplies and independent of whether the power supply is an AC power supply or a DC power supply, the at least one AC voltage control circuitry enables supplying the conveying electrodes of the first arrangement of conveying electrodes and the conveying electrodes of the second arrangement of conveying electrodes with the respective desired AC voltage which can, as explained above, be a radio frequency AC voltage.

In a preferred variant, the conveying electrodes of the first arrangement of conveying electrodes are arranged more compact along the ion guide path than the conveying electrodes of the second arrangement of conveying electrodes are arranged along the ion guide path. Particular preferably, the conveying electrodes of the first arrangement of conveying electrodes are arranged along the ion guide path to extend less than 80%, in particular less than 60%, along the ion guide path as compared to how the conveying electrodes of the second arrangement of conveying electrodes are arranged to extend along the ion guide path.

In order to arrange the conveying electrodes of the first arrangement of conveying electrodes more compact along the ion guide path than the conveying electrodes of the second arrangement of conveying electrodes are arranged along the ion guide path, the spacing between the conveying electrodes of the first arrangement of conveying electrodes can be reduced as compared to the spacing of conveying electrodes of the second arrangement of conveying electrodes. Furthermore or instead, a length of the conveying electrodes of the first arrangement of conveying electrodes measured along the ion guide path at a position of the respective conveying electrode on the ion guide path can be shorter than a length of the conveying electrodes of the second arrangement of conveying electrodes measured along the ion guide path at a position of the respective conveying electrode on the ion guide path.

Thus, particular advantageously, the conveying electrodes of the first arrangement of conveying electrodes are arranged more compact along the ion guide path than the conveying electrodes of the second arrangement of conveying electrodes are arranged along the ion guide path and the length of the conveying electrodes of the first arrangement of conveying electrodes measured along the ion guide path at a position of the respective conveying electrode on the ion guide path is shorter than the length of the conveying electrodes of the second arrangement of conveying electrodes measured along the ion guide path at a position of the respective conveying electrode on the ion guide path.

Particular preferably, the length of the conveying electrodes of the first arrangement of conveying electrodes measured along the ion guide path at a position of the respective conveying electrode on the ion guide path is less than 80%, most preferably less than 60%, of the length of the conveying electrodes of the second arrangement of conveying electrodes measured along the ion guide path at a position of the respective conveying electrode on the ion guide path.

Thus, in case the same AC voltages are applied to the conveying electrodes of the first arrangement of conveying electrodes and to the conveying electrodes of the second arrangement, the first travelling waves provide a shorter wavelength than the second travelling waves due to the more compact arrangement of the conveying electrodes of the first arrangement of conveying electrodes than the arrangement of the conveying electrodes of the second conveying electrodes, with the consequence that the first travelling wave velocity is slower than the second travelling wave velocity. Furthermore, this has the consequence that the first travelling waves provide steeper slopes which lead a higher fields felt by the ions than the second travelling waves provide. Both has the effect that the average velocity of the ions in the first section of the ion guide is faster than the average velocity of the ions in the second section of the ion guide even though the same AC voltages are applied to the conveying electrodes of the first arrangement of conveying electrodes and to the conveying electrodes of the second arrangement. Consequently, designing the ion guide to provide the conveying electrodes of the first arrangement of conveying electrodes being arranged more compact than the conveying electrodes of the second conveying electrodes is a simple way to achieve that for each ion species of the at least N different ion species, the ratio A is larger than the ratio B. Furthermore, a simpler AC voltage supply can be used for operating the ion guide assembly since the same AC voltage supply can be used for the first arrangement of conveying electrodes and for the second arrangement of conveying electrodes. Thereby, the more compact the conveying electrodes of the first arrangement of conveying electrodes are arranged along the ion guide path as compared the conveying electrodes of the second arrangement of conveying electrodes are arranged along the ion guide path, the larger the ratio A becomes as compared to the ratio B.

In another preferred variant, the AC voltages applied to the conveying electrodes of the first arrangement of conveying electrodes provide a lower frequency and/or a higher amplitude than the AC voltages applied to the conveying electrodes of the second arrangement of conveying electrodes. This is as well a simple way to achieve that for each ion species of the at least N different ion species, the ratio A is larger than the ratio B, even in case the conveying electrodes of the first arrangement of conveying electrodes are arranged the same as the conveying electrodes of the second arrangement of conveying electrodes are arranged.

In the present text, the conveying electrodes are called conveying electrodes because they enable providing the driving force for conveying the ions along the conveying path in the conveying direction. The ion guide may however comprise further electrodes in addition to the conveying electrodes of the first arrangement of conveying electrodes and the conveying electrodes of the second arrangement of conveying electrodes. Such additional electrodes may also be arranged in the first section and the second section of the ion guide path. Such additional electrodes may for example be confining electrodes for keeping the ions on the ion guide path when being conveyed along the ion guide path. How such additional electrodes can be arranged is known in the art. Example are shown in EP 3 561 853 A1 of Tofwerk AG and in the article "*Masked Multiplexed Separations to Enhance Duty Cycle for Structures for Lossless Ion Manipulations*" of Brian H. Clowers et al., Analytical Chemistry, 2021, 93, 14, 5727-5734.

As mentioned, according to the invention, the first travelling wave amplitude, the first travelling wave velocity, the second travelling wave amplitude and the second travelling wave velocity are chosen such that for each ion species of the at least N different ion species, the ratio A is larger than the ratio B. In that the ratio A is larger than the ratio B, the ion guide is operated in the first section of the ion guide path in conditions where the first travelling waves have a more trapping effect on the ions of the at least N ion species than the second travelling waves the second section of the ion guide path have. Thus, in the first section of the ion guide path, the ions of the at least N ion species experience the first travelling waves more like potential wells than they experience the second travelling waves in the second section of the ion guide path. Consequently, the ions of the at least N ion species are conveyed more independent of their mobility and thus more uniformly along the first section of the ion guide path than they are conveyed along the second section of the ion guide path. In other words, in the first section of the ion guide, ions having a lower mobility are conveyed at a more similar or even the same speed as ions having a higher mobility. Therefore, when the ion gate is switched from the closed state to the open state and relatively quickly back to the closed state in order to form a pulse of ions in the stream of ions when modulating the stream of ions according to the modulation function, the fraction of ions having a lower mobility which makes it past the ion gate before the ion gate is switched to the closed state again is closer to or even the same as the fraction of ions having a higher mobility which makes it past the ion gate before the ion gate is switched to the closed state again.

Therefore, the method and the ion guide assembly according to the invention enable modulating a stream of ions more precisely according to a modulation function in an ion guide.

Preferably, the modulation function is a binary function. Accordingly, the modulation function may be represented by a row of bits. This has the advantage that it is simple to modulate with the ion gate the stream of ions such that in the conveying direction, the modulated stream of ions has the shape of the modulation function. In a variant, the modulation function is based on a binary function but provides smoothed steps between the bits of the binary function. This has the advantage that depletion of ions immediately downstream of the ion gate and tailing or diffusion of ions in the modulated stream of ions can be taken into account for by adapting the modulation function to these effects in the modulated stream of ions.

Alternatively, however, the modulation function is a nonbinary function.

Preferably, the conveying electrodes of the first arrangement of conveying electrodes and of the second arrangement of conveying electrodes are located outside the spatial region of the ion guide path. In an example, the conveying electrodes have an annular shape and surround the spatial region of the ion guide path in that the ion guide path leads through an opening in the annular shape of the respective conveying electrode. In another example, the conveying electrodes have a shape like a horseshoe and partially surround the spatial region of the ion guide path. In yet another example, the conveying electrodes have a flat, plane-like shape and be arranged in a plane which is parallel to the conveying direction at the respective position of the ion guide path. In yet another example, the conveying electrodes have a linear shape. In this latter example, the conveying electrodes may as well be arranged in a plane which is parallel to the conveying direction at the respective position of the ion guide path. In yet another example, the ion guide comprises two separate planes each with a succession of at least three conveying electrodes, wherein the two separate planes are oriented parallel to each other and wherein the ion guide path is arranged between the two planes.

Advantageously, the first travelling wave amplitude, the first travelling wave velocity, the second travelling wave amplitude and the second travelling wave velocity are chosen such that for each ion species of the at least N different ion species, the ratio A is at least the ratio B multiplied by a factor of 1.1, in particular at least the ratio B multiplied by a factor of 2. Thereby, the higher this factor is, the more precisely the stream of ions can be modulated according to a modulation function. Thus, when the ratio A is at least the ratio B multiplied by the factor of 1.1, the improvement is already increased, while when the ratio A is at least the ratio B multiplied by the factor of 2, the improvement is very significant.

Alternatively, however, the first travelling wave amplitude, the first travelling wave velocity, the second travelling wave amplitude and the second travelling wave velocity are chosen such that for each ion species of the at least N different ion species, the ratio A is less than the ratio B multiplied by the factor of 1.1, while the ratio A is still larger than the ratio B.

Advantageously, the first travelling wave amplitude, the first travelling wave velocity, the second travelling wave amplitude and the second travelling wave velocity are chosen such that for each ion species of the at least N different ion species, the ratio A is smaller than the ratio B multiplied by a factor of one thousand. Alternatively, however, the first travelling wave amplitude, the first travelling wave velocity, the second travelling wave amplitude and the second travelling wave velocity are chosen such that for each ion species of the at least N different ion species, the ratio A is equal or larger than the ratio B multiplied by a factor of one thousand.

Preferably, the second travelling wave velocity is higher than the first travelling wave velocity. This has the advantage that the first travelling wave amplitude and the second travelling wave amplitude can be kept the same and the ion guide is still operated in the first section of the ion guide path in conditions where the first travelling waves have a more trapping effect on the ions of the at least N ion species than the second travelling waves the second section of the ion guide path have. Thus, it is simpler to use the same voltage source can for applying the AC voltages to the conveying electrodes of the first arrangement of conveying electrodes and to the conveying electrodes of the second arrangement of the conveying electrodes. Consequently, the ion guide assembly can be constructed more cost effective which turns the use of the method more cost effective, too.

Alternatively, however, the second travelling wave velocity can be the same as or lower than the first travelling wave velocity.

Preferably, the first travelling wave amplitude and the first travelling wave velocity are chosen such that for each ion species of the at least N different ion species, the ions of the respective ion species are conveyed in the first section of the ion guide path at an average velocity which is higher than 70% of the first travelling wave velocity. This has the advantage that the ion guide is operated in the first section of the ion guide path in conditions where the first travelling waves have a strong trapping effect on the ions of the at least N ion species. Thus, the first section of the ion guide path, ions having a lower mobility are conveyed in nearly the same or exactly the same speed as ions having a higher mobility. Consequently, when the ion gate is switched from the closed state to the open state and relatively quickly back to the closed state in order to form a pulse of ions in the stream of ions when modulating the stream of ions according to the modulation function, the fraction of ions having a lower mobility which makes it past the ion gate before the ion gate is switched to the closed state again is nearly the same or exactly the same as the fraction of ions having a higher mobility which makes it past the ion gate before the ion gate is switched to the closed state again. Therefore, an even more precise modulating of the stream of ions to the modulation function is enabled.

Alternatively, however, the first travelling wave amplitude and the first travelling wave velocity are chosen such that for each ion species of the at least N different ion species, the ions of the respective ion species are conveyed in the first section of the ion guide path at an average velocity which is 70% or less of the first travelling wave velocity.

Independent of whether the first travelling wave amplitude and the first travelling wave velocity are chosen such that for each ion species of the at least N different ion species, the ions of the respective ion species are conveyed in the first section of the ion guide path at an average velocity which is at least 70%, 70% or less of the first travelling wave velocity, the first travelling wave amplitude and the first travelling wave velocity are advantageously chosen such that for each ion species of the at least N different ion species, the ions of the respective ion species are conveyed in the first section of the ion guide path at an average velocity which is less than 110% of the first travelling wave velocity.

Preferably, the ion guide is operated in a gas pressure in a range from 0.01 mbar to 1 bar, from 0.01 mbar to 100 mbar or from 0.01 mbar to 10 mbar, preferably 0.1 mbar to 1 bar, from 0.1 mbar to 100 mbar or from 0.1 mbar to 10 mbar, particular preferably from 1 mbar to 1 bar, from 1 mbar to 100 mbar or from 1 mbar to 10 mbar. In order to achieve this, the ion guide assembly preferably includes a low pressure chamber which enables to provide in the spatial region of the ion guide path a gas pressure in the respective pressure range.

In an alternative, however, the ion guide assembly may be operated in a different gas pressure or even in a vacuum.

Preferably, the first travelling wave amplitude, the first travelling wave velocity, the second travelling wave amplitude and the second travelling wave velocity are chosen such that in the gas pressure in which the ion guide is operated, for each ion species of the at least N different ion species, the ratio A is larger than the ratio B. Particular preferably, the first travelling wave amplitude, the first travelling wave velocity, the second travelling wave amplitude and the second travelling wave velocity are chosen such that in the gas pressure in which the ion guide is operated, for each ion species of the at least N different ion species, the ratio A is at least the ratio B multiplied by the factor of 1.1, more preferably, at least the ratio B multiplied by a factor of 2.

In an advantageous variant, the first travelling wave amplitude, the first travelling wave velocity, the second travelling wave amplitude and the second travelling wave velocity are chosen such that in the gas pressure in which the ion guide is operated, for each ion species of the at least N different ion species, the ratio A is smaller than the ratio 13 multiplied by the factor of one thousand.

Preferably, the first travelling wave amplitude and the first travelling wave velocity are chosen such that in the gas pressure in which the ion guide is operated, for each ion species of the at least N different ion species, the ions of the respective ion species are conveyed in the first section of the ion guide path at an average velocity which is higher than 70% of the first travelling wave velocity.

Advantageously, the first travelling wave amplitude and the first travelling wave velocity are chosen such that in the gas pressure in which the ion guide is operated, for each ion species of the at least N different ion species, the ions of the respective ion species are conveyed in the first section of the ion guide path at an average velocity which is less than 110% of the first travelling wave velocity.

For operating the ion guide in the gas pressure in the indicated pressure range, the ion guide assembly advantageously includes a low pressure chamber which enables to provide in the spatial region of the ion guide path a gas pressure in the respective pressure range indicated above. In order to achieve this, the low pressure chamber advantageously encloses the spatial region of the ion guide path. Thereby, the low pressure chamber is preferably a chamber which separates its inside and thus the spatial region of the ion guide path from an outside of the chamber and which enables to achieve and maintain in its inside a gas pressure in the indicated range. Thus, the low pressure chamber can be incorporated in the ion guide or can be a unit separate from the ion guide. In case the low pressure chamber is incorporated in the ion guide, the ion guide can directly be operated in the indicated gas pressure range. In case the low pressure chamber is a unit separate from the ion guide however, the low pressure chamber surrounds the ion guide or is arranged within the ion guide in operation of the ion guide assembly such that the ion guide can be operated in the indicated gas pressure range. In either case, the low pressure chamber can comprise an inlet for inserting the ions into the low pressure chamber and into the ion guide. Similarly, the low pressure chamber can comprise an outlet for letting the ions out of the low pressure chamber and out of the ion guide. This inlet and this outlet can for example each be an orifice or a tube.

In order to enable the ion guide assembly to be operated in the respective gas pressure range, the low pressure chamber preferably includes a pressure reduction unit or includes a line for connecting to a pressure reduction unit for reducing and maintaining the gas pressure within the indicated range in the low pressure chamber and thus in the spatial region of the ion guide path. In either case, the pressure reduction unit can for example be a vacuum pump.

Alternatively, the ion guide assembly may go without low pressure chamber.

Advantageously, N is at least 2, preferably at least 5, more preferably at least 10. Thus, in case the stream of ions is formed from a sample including analytes which are atoms and/or compounds of interest, these analytes advantageously belong to the N different ion species when being ionised to ions. Consequently, with increasing N, more analytes can be optimally separated with ion mobility separation by employing the method and the ion guide assembly according to the invention. Thus, an improved targeted analysis of the sample is enabled with increased N. This advantage is increased with increasing N.

Alternatively, however, N is at least 1.

Advantageously, the first travelling waves have a wavelength and the transition position is located at a distance of at least one wavelength of the first travelling waves downstream from the ion gate position on the ion guide path. This has the advantage that the first section of the ion guide path reaches a distance downstream of the ion gate position long enough for enabling conveying ions having a lower mobility and ions having a higher mobility reliably with a same or at least similar speed downstream away from the ion gate out of an influence range of the ion gate. Therefore, the stream of ions is modulated more accurately according to the modulation function. Alternatively, however, the transition position is located at a distance of less than one wavelength of the first travelling waves downstream from the ion gate position on the ion guide path.

Preferably, the transition position is located at a distance of less than 100 wavelengths of the first travelling waves, particular preferably less than 20 wavelengths of the first travelling waves, most preferably less than 5 wavelengths of the first travelling waves, downstream from said ion gate position on said ion guide path. This with decreasing distance of the transition position from the ion gate position, that the second section of the ion guide path is located closer to the ion gate. This has the advantage that in case the method and the ion guide assembly are employed for ion mobility spectrometry, the efficiency of the method and the ion guide assembly is increased. Alternatively, however, the transition position is located at a distance of 100 wavelengths of the first travelling waves or more downstream from said ion gate position on said ion guide path.

Advantageously, the first section of the ion guide path reaches from the ion gate position upstream to an entrance end of the first section of the ion guide path. Thereby, it is irrelevant whether the entrance end of the first section of the ion guide path is at the same time the entrance end of the ion guide path or whether the entrance end of the first section of the ion guide path is located downstream of an entrance end of the ion path. The first section of the ion guide path reaching from the ion gate position upstream to an entrance end of the first section of the ion guide path has the advantage that when the ion gate is switched from the closed state to the open state, ions immediately upstream of the ion gate are fetched by the first travelling waves and conveyed more uniformly and more independent of their mass and mobility downstream past the ion gate. Therefore, the stream of ions is modulated more accurately according to the modulation function. In particular the beginning of ion pulses formed by the modulation function is shaped more accurately according to the modulation function.

Preferably, the first travelling waves have a wavelength and the entrance end of the first section of the ion guide path is located at a distance of at least one wavelength of the first travelling waves upstream from the ion gate position on the ion guide path. This has the advantage that the first section of the ion guide path reaches far enough upstream from the ion gate such that when the ion gate is switched from the closed state to the open state, the ions immediately upstream of the ion gate are fetched by the first travelling waves and conveyed more uniformly and more independent of their mass and mobility downstream past the ion gate.

Preferably, the entrance end of the first section of the ion guide path is located at a distance of less than 1'000'000'000'000 wavelengths of the first travelling waves, particular preferably less than 100 wavelengths of the first travelling waves, more preferably less than 20 wavelengths of the first travelling waves, more preferably less than 5 wavelengths of the first travelling waves, upstream from the ion gate position on the ion guide path. This has the advantage that the ion guide path can be designed as short as possible while still obtaining the advantage of the first section of the ion guide path reaching upstream from the ion gate.

In a variant, however, the entrance end of the first section of the ion guide path is located at a distance of 1'000'000'000'000 or more wavelengths of the first travelling waves upstream from the ion gate position on the ion guide path.

Alternatively to these variants, however, the first section of the ion guide path reaches from the ion gate position upstream to an entrance end of the first section of the ion guide path.

Preferably, the ion gate provides a length measured along the ion guide path at the ion gate position which is maximally one fifth, particular preferably maximally one tenth of the average length of the conveying electrodes of the first arrangement of conveying electrodes measured along the length of the ion guide path. Thereby, in order to obtain the average length of the conveying electrodes of the first arrangement of conveying electrodes, the length of each one of the conveying electrodes of the first arrangement of conveying electrodes is measured at the position of the respective conveying electrode, whereafter the average of this lengths is calculated. This has the advantage that a zone in the region of the ion gate is minimised in which the ions are influenced and disturbed by the ion gate. Alternatively, however, the ion gate provides a length measured along the ion guide path at the ion gate position which is longer than one fifth of the average length of the conveying electrodes of the first arrangement of conveying electrodes measured along the length of the ion guide path.

Preferably, the ion gate provides a length measured along the ion guide path at the ion gate position which is shorter than 0.5 mm, particular preferably shorter than 0.3 mm, most preferably shorter than 0.1 mm. This has the advantage that a zone in the region of the ion gate is minimised in which the ions are influenced and disturbed by the ion gate. Alternatively, however, the ion gate provides a length measured along the ion guide path at the ion gate position which is 0.5 mm or more.

Advantageously, the method according to the invention is employed in a method for determining a mobility of ions. In this method for determining a mobility of ions, a stream of ions is modulated according to a modulation function with the method according to the invention and subsequently passed through an ion mobility separation cell for separating the ions in the stream of ions according to their mobility, wherein the ions having passed the ion mobility separation cell are detected with an ion detector which provides a signal representing the detected ions and the mobility of the ions is determined based on the signal obtained from the ion detector. Thereby, the mobility of the ions is advantageously determined with an ion mobility determination unit based on the signal obtained from the ion detector.

Advantageously, the method for determining the mobility of ions includes the preliminary step of ionising a sample including analytes which are atoms and/or compounds of interest with an ion source to the ions, wherein these analytes belong to the N different ion species when being ionised to the ions. Alternatively, however the method for determining the mobility of ions goes without this preliminary step. Such an alternative is for example, in case the ions are already available and no ionisation to obtain the ions is required.

Like the method according to the invention is advantageously employed in a method for determining a mobility of ions, the ion guide assembly is advantageously employed in an apparatus for determining a mobility of ions with the method for determining a mobility of ions described herein. Thus, an apparatus for determining a mobility of ions with the method for determining a mobility of ions described herein advantageously includes an ion guide assembly according to the invention for modulating a stream of ions according to a modulation function with the method according to the invention, wherein the apparatus advantageously further includes an ion mobility separation cell for separating the ions in the stream of ions according to their mobility after the stream of ions is modulated according to the modulation function, an ion detector for detecting the ions after having passed the ion mobility separation cell and for providing a signal representing the detected ions and an ion mobility determination unit for determining the mobility of the ions based on the signal obtained from the ion detector.

Advantageously, the ion detector is a mass analyser for obtaining mass spectra from the ions detected with the mass analyser. This has the advantage that the ions in the stream of ions can be first separated according to their mobility and subsequently mass analysed. Therefore, a more detailed analysis of the ions in the stream of ions can be achieved. Alternatively, if no mass spectra of the ions in the stream of ions is required, the ion detector may be a detector which only detects ions and does not measure mass spectra. The latter case has the advantage that the apparatus employed for executing the method is simpler and can be constructed cheaper. Examples for such ion detectors are photomultipliers, Faraday cages and micro channel plates.

Advantageously, the apparatus for determining the mobility of ions includes an ion source for ionising a sample including analytes which are atoms and/or compounds of interest to the ions, wherein these analytes belong to the N different ion species when being ionised to the ions. Alternatively, however the apparatus for determining the mobility of ions goes without this ion source. Thus, in this alternative, the apparatus can be constructed simpler in case the ions are already available and no sample is required to be ionised to the ions first for obtaining the ions.

Preferably, in the method, the second section of the ion guide path passes through the ion mobility separation cell and the ions are separated according to their mobility when being conveyed along the second section of the ion guide path. Preferably, in the apparatus, the second section of the ion guide path is passed through the ion mobility separation cell and the ions are separatable according to their mobility when being conveyed along the second section of the ion guide path. This has the advantage that the ions can be separated according to their mobility very efficiently. Alternatively, however, the second section of the ion guide path circumvents the ion mobility separation cell.

Advantageously, the mobility of the ions is obtained by calculating a correlation of the modulation function and the signal obtained from the ion detector, wherein an autocorrelation of the modulation function is a two-valued function. This means that the autocorrelation function has a peak at one value like for example at zero and a constant value at all other values. This has the advantage that more ions can be separated according to their mobility within the same period of time. Thereby, the correlation is advantageously calculated with a calculation unit. Thus, the apparatus advantageously includes a calculation unit for calculating the correlation of the modulation function and the signal obtained from the ion detector, wherein an autocorrelation of the modulation function is a two-valued function, in order to obtain the mobility of the ions.

The modulation function is advantageously a pseudorandom sequence. This has the advantage that it is simple to provide the modulation function which is a two-valued function. In a variant however, the modulation function is not a pseudorandom sequence.

Independent of whether the modulation function is a pseudorandom sequence or not, this multiplexing of the measurement is explained in more detail in EP 2 587 259 A1 of Tofwerk AG. Alternatively, however, the mobility of the ions is not obtained by calculating a correlation of the modulation function and the signal obtained from the ion detector, wherein an autocorrelation of the modulation function is a two-valued function. For example, the modulation function may consist of regular or irregular pulses with pauses in between which are long enough such that the slowest ions of a particular pulse arrive at the ion detector before the fastest ions of the subsequent pulse arrive at the ion detector in order to be able to assign the detected ions to a particular pulse and in order to determine the mobility of the ions.

Advantageously, the apparatus includes an apparatus control unit adapted to control the apparatus to execute the method for determining the mobility of the ions. Thereby, the control unit of the ion guide assembly may be incorporated into the apparatus control unit or may be a separate control unit. In this latter case, the apparatus control unit is advantageously adapted to control to control unit of the ion guide assembly in order to control the ion guide assembly for controlling the apparatus to execute the method for determining the mobility of the ions.

Alternatively, the apparatus may go without such an apparatus control unit.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
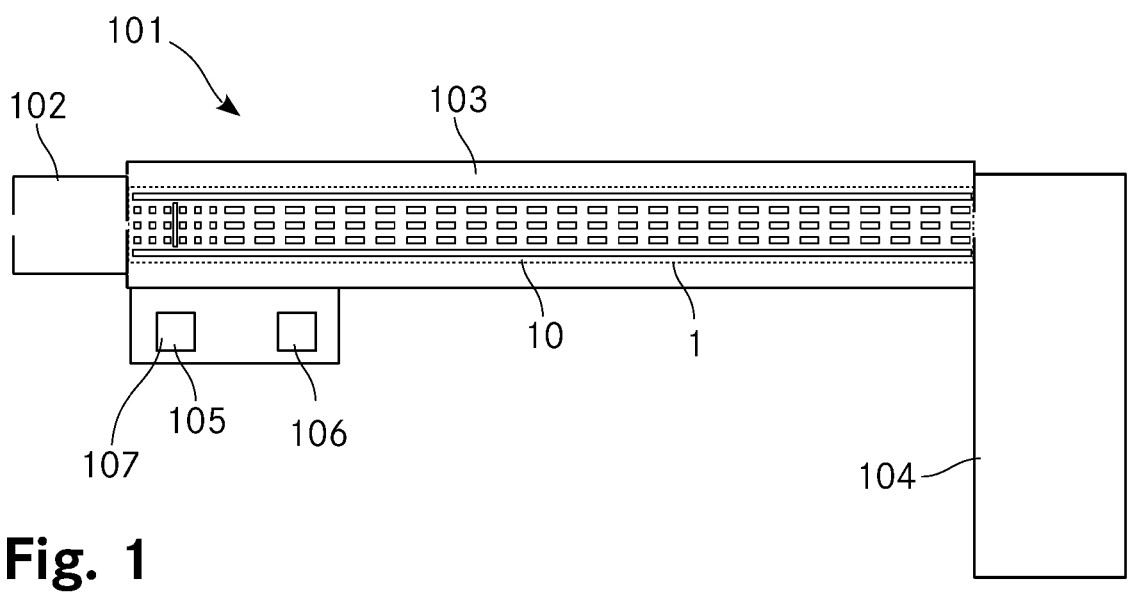
FIG. 1 a simplified schematic view of an apparatus for determining a mobility of ions with a method for determining a mobility of ions, the apparatus including an ion guide assembly according to the invention, FIG. 2 a simplified schematic view of the ion guide assembly according to the invention for executing the method according to the invention, and FIG. 3 a simplified schematic view of another ion guide assembly according to the invention for executing the method according to the invention.

FIG. 1 shows a simplified schematic view of an apparatus 101 for determining a mobility of ions with the above described method for determining a mobility of ions. This apparatus 101 includes an ion source 102 for ionising a sample including analytes to ions, wherein the analytes are atoms and/or compounds of interest and belong to N different ion species when being ionised to the ions. The apparatus 101 further includes an ion mobility separation cell 103 for separating the ions according to their mobility. This ion mobility separation cell 103 is fluidly coupled to the ion source 102 for receiving a stream of the ions ionised by the ion source 102. In the present example, the ion source 102 is a continuous ion source. In other variants, however, the ion source 102 is a pulsed ion source.

The apparatus 101 further includes an ion detector 104 for detecting the ions of the stream of ions after they have passed the ion mobility separation cell 103 and thus after they have been separated according to their mobility. The ion detector 104 is arranged downstream of the ion mobility separation cell 103 and is for providing a signal representing the detected ions. In the present embodiment, the ion detector 104 is a mass analyser, namely a time of flight mass analyser for obtaining mass spectra from the ions detected with the mass analyser. Furthermore, the apparatus 101 includes an ion mobility determination unit 105 for determining the mobility of the ions based on the signal obtained from the ion detector 104. Additionally, the apparatus 101 includes a control unit 106 which is adapted to control the apparatus 101 to execute the method for determining the mobility of the ions.

The apparatus 101 furthermore includes an ion guide assembly 1 according to the invention for modulating the stream of the ions according to a modulation function with the method according to the invention, wherein the stream of ions includes the at least N different ion species, wherein N is at least 1. This ion guide assembly 1 is marked in FIG. 1 with a dashed rectangle. The ion guide assembly 1 includes an ion guide 10 which is arranged in the ion mobility determination cell 1 and forms an ion guide path, wherein the ions of the stream of ions are conveyable along the ion guide path in a conveying direction to form the stream of ions. In operation of the apparatus 101, the ion guide assembly 1 is operated such that the ions of the stream of ions is conveyed along the ion guide path, whereby the ions are separated according to their mobility.

The ion guide 10 includes two printed circuit boards 11 which are identical to each other. These two printed circuit boards 11 are each arranged in a plane and are arranged parallel to each other at a distance from each other. Thus, pattern of electrodes including the conveying electrodes 230, 240 discussed later on in the context of FIG. 2 are arranged on the two printed circuit boards 11, wherein the two printed circuit boards 11 are arranged parallel to each other such that the same electrodes of the two pattern of electrodes are arranged opposite to each other.

Between the two printed circuit boards 11, the ion guide path is arranged. This general design of an ion guide with two printed circuit boards with the ion guide path in between is known in the art. Examples are shown in FIGS. 1B and 4B of U.S. Pat. No. 8,835,839 B1 of Battelle Memorial Institute and also explained in paragraph [01201] of EP 3 561 853 A1 of Tofwerk AG.

Figure 2:
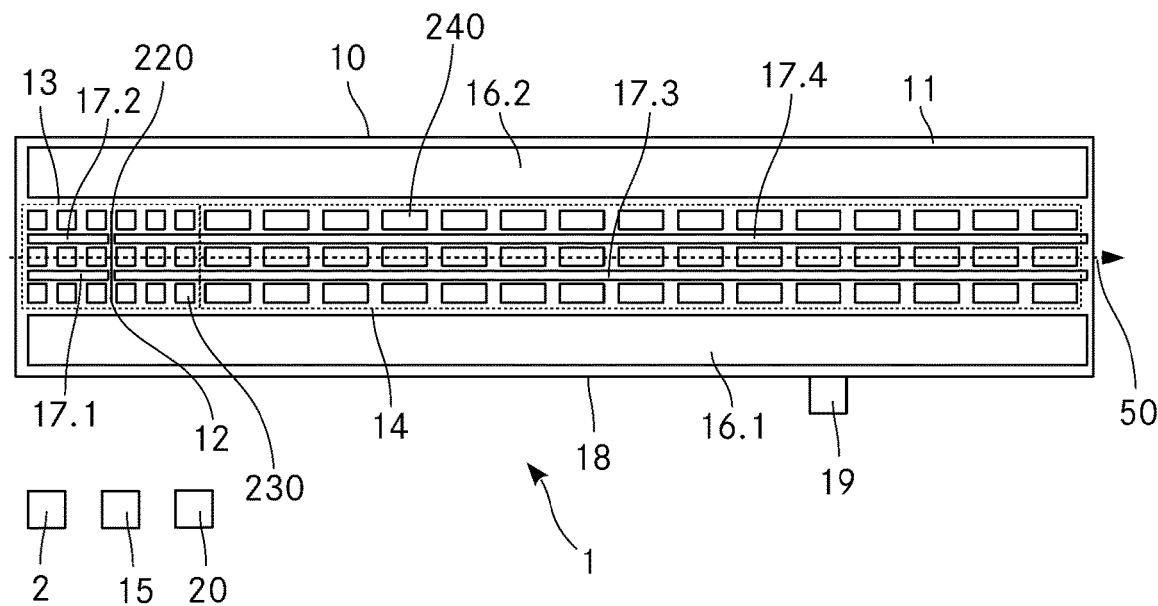

FIG. 2 shows a simplified schematic view of the ion guide assembly 1 according to the invention with the ion guide 10 forming an ion guide path. Thereby, for simplicity reasons, only one of the two printed circuit boards 11 of the ion guide 10 is shown in a top view in order to illustrate the design of the ion guide 10.

In the ion guide 10, the ions of the stream of ions are conveyable along the ion guide path in the conveying direction to form the stream of ions. Thereby the ion guide path is a spatial region between the two printed circuit boards 11, wherein the ions of the stream of ions move within the spatial region of the ion guide path when being conveyed along the ion guide path in the conveying direction. The course of the ion guide path and the conveying direction are indicated in FIG. 2 with an arrow 50.

Each one of the printed circuit boards 11 includes two elongated first DC confinement electrodes 16.1, 16.2 which are arranged parallel to each other. They extend along the ion guide path which runs between them. In operation of the ion guide 10, a first DC voltage is applied to these first DC confinement electrodes 16.1, 16.2 for maintaining the ions on the ion guide path. Thus, the ion guide assembly 1 includes a corresponding first DC voltage source which is however not shown here.

Furthermore, each one of the printed circuit boards 11 includes two pairs of elongated second DC confinement electrodes 17.1, 17.2, 17.3, 17.4 which are arranged parallel to the first DC confinement electrodes 16.1, 16.2. A first pair of these second DC confinement electrodes 17.1, 17.2 reaches from the entrance end of the ion guide path very close to an ion gate position, while the second pair of these second DC confinement electrodes 17.3, 17.4 reaches from very close to the ion gate position to an exit end of the ion guide path. In operation of the ion guide 10, a second DC voltage is applied to these second DC confinement electrodes 17.1, 17.2, 17.3, 17.4 for maintaining the ions on the ion guide path. Thereby, the second DC voltage is smaller than the first DC voltage such that the ions are maintained between the two printed circuit boards 11 and between the two first DC confinement electrodes 16.1, 16.2 in the spatial region of the ion guide path. Thus, the ion guide assembly 1 includes a corresponding second DC voltage source which is however not shown here.

How the first and second DC confinement electrodes 16.1, 16.2, 17.1, 17.2, 17.3, 17.4 can be arranged is known in the art. Furthermore, some or all of these first and second DC confinement electrodes 16.1, 16.2, 17.1, 17.2, 17.3, 17.4 can be replaced with AC confinement electrodes to which radio frequency AC voltages are applied in order to hinder the ions of the stream of ions to get too close to these AC confinement electrodes. Such AC confinement electrodes are as well known in the art. They are usually employed in pairs arranged close to each other, wherein the phase of the radio frequency AC voltages applied to the two AC confinement electrodes belonging to one pair differs by 180° in order to generate a pseudopotential which acts on the ions as a repulsive force, driving the ions away from the respective pair of AC confinement electrodes.

As shown in FIG. 2, the ion guide 10 includes an ion gate 12 which is arranged at the ion gate position on the ion guide path. This ion gate 12 is formed by two ion gate electrodes 220 which are each arranged on another one of the two circuit boards 11 opposite to each other. The ion gate electrodes 220 are elongated and oriented at an angle of 90° to the course of the ion guide path.

In order to operate the ion gate 12, the ion guide assembly 1 includes a gate voltage control circuitry 20 for applying a blocking voltage to the two ion gate electrodes 220. By applying the blocking voltage to the ion gate electrodes 220, the ion gate 12 is switched to a closed state where it prevents the ions of the ion stream to pass the ion gate position when being conveyed along the ion guide path. As soon as the blocking voltage is turned off, however, the ion gate 12 is switched to an open state where the ions of the stream of ions are allowed to pass the ion gate position when being conveyed along the ion guide path. Thereby, the blocking voltage is a DC voltage. In another example, the blocking voltage is an AC voltage which is provided with opposite phases to the two ion gate electrodes 220. In this latter case, the ion gate 12 is operated in the blocking state in the same way as to the above described pairs of AC confinement electrodes are operated.

The ion guide 10 further includes a first arrangement 13 of conveying electrodes 230 arranged along the ion guide path. This first arrangement 13 of conveying electrodes 230 extends over a first section of the ion guide path. The first section of the ion guide path starts at an entrance end of the first section of the ion guide path which is located at entrance end of the ion guide path, coinciding with the first end of the ion guide 10, and reaches downstream across the ion gate position to a transition position of the ion guide path.

The first arrangement 13 of conveying electrodes 230 is adapted for generating first travelling waves having a first travelling wave amplitude and travelling along the entire first section of the ion guide path at a first travelling wave velocity for conveying the ions along the first section of the ion guide path. Thereby, the first travelling waves have a wavelength.

The entrance end of the first section of the ion guide path is located at a distance of one wavelength of the first travelling waves upstream from the ion gate position on the ion guide path, while the transition position is located at a distance of one wavelength of the first travelling waves downstream from the ion gate position on the ion guide path. In variants, the entrance end of the first section of the ion guide path is located further upstream of the ion gate position. In examples, the entrance end of the first section of the ion guide path is located 3 wavelengths of the first travelling waves, 18 wavelengths of the first travelling waves, 90 wavelengths of the first travelling waves and 1'000 wavelengths of the first travelling waves, respectively, upstream of the ion gate position. Furthermore, in variants, the first section of the ion guide path reaches from the ion gate position further downstream than one wavelength of the first travelling waves. In examples, the first section of the ion guide path reaches from the ion gate position 3 wavelengths of the first travelling waves, 18 wavelengths of the first travelling waves and 90 wavelengths of the first travelling waves, respectively, downstream. In all these examples, the transition position can be located at the downstream end of the first section of the ion guide path or may by somewhat upstream of the downstream end of the first section of the ion guide. Particular advantageously, the downstream end of the first section of the ion guide path is however at the transition position.

The ion guide 10 furthermore includes a second arrangement 14 of conveying electrodes 240 arranged along the ion guide path. This second arrangement 14 of conveying electrodes 240 extends over a second section of the ion guide path, the second section of the ion guide path reaching from the transition position downstream to a downstream end of the second section. In the present embodiment shown in FIG. 2, this downstream end of the second section is at the second end, also referred to as exit end, of the ion guide and thus coincides with the output end of the ion guide path.

The second arrangement 14 of conveying electrodes 240 is adapted for generating second travelling waves having a second travelling wave amplitude and travelling along the entire second section of the ion guide path at a second travelling wave velocity for conveying the ions along the second section of the ion guide path. Thereby, the second travelling waves have a wavelength. In units of this wavelength of the second travelling waves, the second section of the ion guide path has a length of 1'000 wavelengths.

Both the conveying electrodes 230 of the first arrangement 13 of conveying electrodes 230 and the conveying electrodes 240 of the second arrangement 14 of conveying electrodes 240 are arranged in three parallel lines along their respective section of the ion guide path. Thereby, a first one of these three parallel lines runs between one of the first DC confinement electrodes 16.1 and, upstream of the ion gate position, a first one of the first pair of the second DC confinement electrodes 17.1, and, downstream of the ion gate position, a first one of the second pair of the second DC confinement electrodes 17.3. A second one of the three parallel lines runs upstream of the ion gate position between the first pair of the second DC confinement electrodes 17.1, 17.2 and downstream of the ion gate position between the second pair of the second DC confinement electrodes 17.3, 17.4. The third one of the three parallel lines runs upstream of the ion gate position between the second one of the first pair of the second DC confinement electrodes 17.2 and the second one of the first DC confinement electrodes 16.2 and downstream of the ion gate position between the second one of the second pair of the second DC confinement electrodes 17.4 and the second one of the first DC confinement electrodes 16.2. The ion guide assembly 1 includes furthermore a low pressure chamber 18 surrounding the ion guide 10 for providing in the spatial region of the ion guide path a gas pressure which is reduced as compared to the atmospheric pressure. This low pressure chamber 18 comprises an inlet for inserting the ions into the low pressure chamber at the entrance end of the ion guide 10 and into the ion guide 10. Furthermore, the low pressure chamber 18 comprises an outlet for letting the ions out of the low pressure chamber 18 and out of the ion guide 10 at the exit end of the ion guide 10. The low pressure chamber 18 includes a pressure reduction unit 19 in the form of a vacuum pump for reducing and maintaining the reduced gas pressure in the low pressure chamber 18 and thus in the spatial region of the ion guide path 10. Instead of the pressure reduction unit 19, the low pressure chamber 18 may include a line for connecting the ion guide assembly 1 to a pressure reduction unit for reducing and maintaining the gas pressure in the low pressure chamber 18 and thus in the spatial region of the ion guide path 10.

In the embodiment shown in FIG. 2, the ion guide assembly 1 is operated at a gas pressure of 3 mbar in the low pressure chamber 18. However, the ion guide assembly 1 can as well be operated at other gas pressures in the low pressure chamber 18. In examples, this gas pressure is in a range from 0.01 mbar to 1 bar, in a range from 0.01 mbar to 100 mbar, in a range from 0.01 mbar to 10 mbar, in a range 0.1 mbar to 1 bar, in a range from 0.1 mbar to 100 mbar, in a range from 0.1 mbar to 10 mbar, in a range from 1 mbar to 1 bar, in a range from 1 mbar to 100 mbar and in a range from 1 mbar to 10 mbar. Thus, the gas pressure in the reduced may for example be 0.015 mbar, 0.09 mbar, 1.1 mbar, 10 mbar, 50 mbar, 100 mbar, 500 mbar or 900 mbar.

The ion guide assembly 1 further includes an AC voltage control circuitry 15 which is connected to the first arrangement 13 of conveying electrodes 230 for supplying the conveying electrodes 230 of the first arrangement 13 of conveying electrodes 230 with AC voltages for generating the first travelling waves for conveying the ions of the stream of ions downstream of the ion gate 12 along the first section of the ion guide path in the conveying direction away from the ion gate 12. This AC voltage control circuitry 15 is as well connected to the second arrangement 14 of conveying electrodes 240 for supplying the conveying electrodes 240 of the second arrangement 14 of conveying electrodes 240 with AC voltages for generating the second travelling waves for conveying the ions along the second section of the ion guide path in the conveying direction away from the ion gate 12 to the second end of the ion guide. The AC voltage control circuitry 15 provides a sinusoidal AC voltage at a frequency of 70 kHz and a peak-to-peak voltage of 20 V. For example, the frequency can be in the range from 60 kHz to 80 kHz, while the peak-to-peak voltage is in the range from 10 V to 30 V. In variants, the frequency of the sinusoidal AC voltage may be lower or higher. Higher frequencies in the radio frequency range like for example 100 kHz, 150 kHz or even more than 500 kHz, like 5 MHz or 50 MHz are possible, too. Similarly, lower frequencies like for example 10 kHz or 40 kHz are possible, too. As well, lower and higher peak-to-peak voltages than 10 V and 30 V, respectively, are possible, too. Optimally, the peak-to-peak voltages are chosen such that when the AC voltages are applied to the first and second conveying electrodes, the maximum strength of the electric field generated by the conveying electrodes is in a range between 1 V/mm and 5'000 V/mm. In further variants, the shape of the AC voltages provided by the AC voltage control circuitry 15 differ from a sinusoidal AC voltage. The AC voltages may follow a periodic curve which is different from a sine curve. Thereby, the periodic curve may be a continuously differentiable curve or may be a curve providing kinks and thus provide positions where it is not differentiable. The AC voltages may thus for example be periodical, rectangular shaped DC voltage pulses.

The AC voltage control circuitry 15 is connected to the conveying electrodes 230, 240 of the first and second arrangement 13, 14 of conveying electrodes 230, 240 such that the first and second travelling waves, respectively, are generated. How this is achieved is explained in great detail in EP 3 561 853 A1 of Tofwerk AG. In the present embodiment shown in FIG. 2, for both the first and the second arrangement 13, 14 of conveying electrodes 230, 240, the respective conveying electrodes 230, 240 are arranged in a succession of each other along the ion guide path. The AC voltage control circuitry 15 is a unit which is separate from the ion guide 10. It is connected to each one of the respective conveying electrodes 230, 240 for supplying each one of the respective conveying electrodes 230, 240 with the respective AC voltage having the frequency of 70 kHz and the peak-to-peak amplitude of 20 Volt. Thereby, for each one of the conveying electrodes 230, 240 which is succeeding in the succession of the respective conveying electrodes 230, 240 a preceding neighbouring conveying electrode 230, 240 of the respective conveying electrodes 230, 240, the AC voltage has a phase decreased by an amount of 120° as compared to for the respective preceding neighbouring respective conveying electrode 230, 240. Thus, as the respective conveying electrodes 230, 240 are supplied with the AC voltages, the first travelling waves and the second travelling waves are generated along the ion guide path. Thereby, the first travelling waves and the second travelling waves are AC potential waves. Due to the phase difference of 120° between the respective conveying electrodes 230, 240, the first travelling waves generated in the first section of the ion guide path have a wavelength which extends over three neighbouring conveying electrodes 230 of the first arrangement 13 of conveying electrodes 230, while the second travelling waves generated in the second section of the ion guide path have a wavelength which extends over three neighbouring conveying electrodes 240 of the second arrangement 14 of conveying electrodes 240. Thereby, the first travelling waves move in conveying direction along the entire first section of the ion guide path and the second travelling waves move in conveying direction along the entire second section of the ion guide path, respectively. Thus, for the ions of the stream of ions, the first travelling waves and the second travelling waves are felt as a driving force that conveys the ions of the stream of ions along the ion guide path in the conveying direction. In order to simplify the transition from the first section of the ion guide path to the second section of the ion guide path, the first travelling waves and the second travelling waves are chosen to be in phase at the transition position.

The invention is not limited to this particular arrangement of how the AC voltages are supplied to the conveying electrodes 230, 240 of the first arrangement 13 of conveying electrodes 230 and the second arrangement 14 of conveying electrodes 240, respectively. Other options are readily available to the person skilled in the art. In an example, the phase difference between the neighbouring conveying electrodes 230, 240 is chosen to be smaller than 120°. As example, the phase difference may be chosen to be 90° or 60°. Other options of how the AC voltages can be supplied to the conveying electrodes 230, 240 of the first arrangement 13 of conveying electrodes 230 and the second arrangement 14 of conveying electrodes 240, respectively, are explained in EP 3 561 853 A1 of Tofwerk AG.

As illustrated schematically in FIG. 2, the first arrangement 13 of conveying electrodes 230 are arranged more compact along the ion guide path than the conveying electrodes 240 of the second arrangement 14 of conveying electrodes 240 are arranged along the ion guide path. Thereby, a length of each of the conveying electrodes 230 of the first arrangement 13 of conveying electrodes 230 measured along the ion guide path at a position of the respective conveying electrode 230 on the ion guide path is 1.0 mm. A length of each of the conveying electrodes 240 of the second arrangement 14 of conveying electrodes 240 measured along the ion guide path at a position of the respective conveying electrode 240 on the ion guide path however is 2.0 mm. Thus, the length of the conveying electrodes 230 of the first arrangement 13 of conveying electrodes 230 measured along the ion guide path is half of the length of the conveying electrodes 240 of the second arrangement 14 of conveying electrodes 240 measured along the ion guide path at a position of the respective conveying electrode 240 on the ion guide path. Furthermore, a spacing between the conveying electrodes 230 of the first arrangement 13 of conveying electrodes 230 measured along the ion guide path is 0.1 mm, while a spacing between the conveying electrodes 240 of the second arrangement 14 of conveying electrodes 240 measured along the ion guide path is 0.2 mm Thus, the spacing between the conveying electrodes 230 of the first arrangement 13 of conveying electrodes 230 measured along the ion guide path is only half as much as the spacing between the conveying electrodes 240 of the second arrangement 14 of conveying electrodes 240 measured along the ion guide path. Thus, the conveying electrodes 230 of the first arrangement 13 of conveying electrodes 230 are arranged along the ion guide path to extend only 50% as much along the ion guide path as compared to how the conveying electrodes 240 of the second arrangement 14 of conveying electrodes 240 are arranged to extend along the ion guide path. As a consequence, even though the same AC voltages are applied with the AC voltage control circuitry 15 to the conveying electrodes 230 of the first arrangement 13 of conveying electrodes 230 and to the conveying electrodes 240 of the second arrangement 14 of conveying electrodes 240 for generating the first and second travelling waves, respectively, the first travelling waves have a wavelength which is half the wavelength of the second travelling waves, and the first travelling wave velocity is half of the second travelling wave velocity. Thus, the second travelling wave velocity is by a factor of two higher than the first travelling wave velocity while the second travelling wave amplitude is the same as the first travelling wave amplitude.

In numbers, in the present example, the wavelength of the first travelling waves is 3.3 mm, while the wavelength of the second travelling waves is 6.6 mm. Since the AC voltages applied to the conveying electrodes 230, 240 have a frequency of 70 kHz, the first travelling wave velocity is 231 m/s while the second travelling wave velocity is 462 m/s. Together with the peak-to-peak voltage of 20 V for the AC voltages applied to the conveying electrodes 230, 240 and the gas pressure of 3 mbar in the low pressure chamber 18, this arrangement has the effect that the mobility of the ions of most ion species in the mass-to-charge range from 100 u/e to 250 u/e is such that the ions have an average velocity in the first section of the ion guide path which is between 70% and 100% of the first travelling wave velocity, while in the second section of the ion guide path, they have an average velocity which is slower than in the first section of the ion guide path. Thereby, the average velocity of the ions in the stream of ions in the second section of the ion guide path is strongly dependent on the mobility of the respective ion. For lighter ions with a mass-to-charge ratio of about 100 u/e, the average velocity in the second section of the ion guide path is often fairly close to their average velocity in the first section of the ion guide path, while for heavier ions with a mass-to-charge ratio of about 250 u/e, the average velocity in the second section of the ion guide path may easily become slower by a factor of 3 or 4 as compared to their average velocity in the first section of the ion guide path. Thus, an optimal separation of the ions according to their mobility can be achieved by conveying the ions along the second section of the ion guide path. At the same time, the conditions are such that the ions are conveyed along the first section of the ion guide path past the ion gate in the open state of the ion gate uniformly and almost independent of their mobility.

In an example for operating the apparatus 101, the apparatus 101 is used to determine a mobility of the ions obtained from a gaseous sample by determining the mobility of the ions with the above described method for determining the mobility of the ions. In this example, the gaseous sample is fed to the ion source 102 and ionised with the ion source 102. The gaseous sample includes 15 different atoms and/or compounds of interest and thus 15 analytes. In the present example, these analytes have masses in the range from 100 u to 250 u. Thus, the ions obtained from the 15 analytes belong to 15 different ion species having a mass-to-charge ratio in the range from 100 u/e to 250 u/e. In variants to this example, the sample can be of a different form than a gaseous form. Furthermore, it can comprise less than 15 atoms and/or compounds of interest or more than 15 atoms and/or compounds of interest and thus more or less than 15 analytes. In variants, the ions obtained from the analytes belong to different ion species having a mass-to-charge ratios within, above or below the range from 100 u/e to 250 u/e.

The ions obtained from the sample are transferred into the ion mobility separation cell 103 and into the ion guide 10. Since the ion source 102 is a continuous ion source, in the present example, a continuous stream of ions with ions of the 15 different ion species having a mass-to-charge ratio in the range from 100 u/e to 250 u/e is inserted into the ion guide 10. This stream of ions is then modulated with the ion gate 12 according to a modulation function with the method according to the invention. Subsequently, the ions of the stream of ions are passed along the second section of the ion guide path and thus passed through an ion mobility separation cell 103 for separating the ions in the stream of ions according to their mobility. Thereafter, the ions having passed the ion mobility separation cell 103 are detected with the ion detector 104 which provides a signal representing the detected ions and the mobility of the ions is determined with the ion mobility determination unit 105 based on the signal obtained from the ion detector 104.

In this example, the stream of ions includes N different ion species wherein N is equal 15. In variants, however, any other positive integer value of N is possible as well. For example, N can be 1, 2, 3, 4, 8, 10, 50 or more.

In the present example where N is equal 15, for each ion species of the at least N different ion species, a ratio A is the average velocity of the ions of the respective ion species in the first section of the ion guide path divided by the first travelling wave velocity. Furthermore, for each ion species of the at least N different ion species, a ratio B is the average velocity of the ions of the respective ion species in the second section of the ion guide path divided by the second travelling wave velocity. Due to the above described characteristics of the ion guide assembly 1 and the parameters at which the ion guide assembly 1 is operated, for each ion species of the at least N different ion species, the ratio A is larger than twice the ratio B. Thus, for each ion species of the at least N different ion species, the ratio A is larger than the ratio B, larger than the ratio B multiplied by a factor of 1.1 and even larger than the ratio B multiplied by the factor of 2. At the same time, in this specific example, the ratio A is smaller than the ratio B multiplied by the factor of 100. Consequently, the ion guide 10 is operated in the first section of the ion guide path in conditions where the first travelling waves have a more trapping effect on the ions of the at least N ion species than the second travelling waves the second section of the ion guide path have. Therefore, in the first section of the ion guide path, the ions of the at least N ion species experience the first travelling waves more like potential wells than they experience the second travelling waves in the second section of the ion guide path. They are conveyed in the first section of the ion guide path with an average velocity between 70% and 100% of the first travelling wave velocity. Consequently, the ions of the at least N ion species are conveyed more independent of their mobility and thus more uniformly along the first section of the ion guide path than they are conveyed along the second section of the ion guide path. In other words, in the first section of the ion guide, ions having a lower mobility are conveyed at a more similar or even the same speed as ions having a higher mobility. Therefore, when the ion gate 12 is switched from the closed state to the open state and relatively quickly back to the closed state in order to form a pulse of ions in the stream of ions when modulating the stream of ions according to the modulation function, the fraction of ions having a lower mobility which makes it past the ion gate 12 before the ion gate 12 is switched to the closed state again is closer to or even the same as the fraction of ions having a higher mobility which makes it past the ion gate 12 before the ion gate is switched to the closed state again. Therefore, in the ion guide 10, the stream of ions is modulated very accurately according to a modulation function, whereafter the ions are separated according to their mobility.

The modulation function according to which the stream of ions is modulated is a binary function in the form of a pseudorandom sequence. An autocorrelation of this modulation function is a two-valued function having a peak at zero and a constant value at all other values. In order to obtain the mobility of the ions, a correlation of the modulation function and the signal obtained from the ion detector 104 is calculated with a calculation unit 107. This calculation unit 107 is part of the ion mobility determination unit 105. This correlation provides in the first place the time distribution of the ions required for passing the ion mobility separation cell 103. Thus, the correlation is the drift time distribution and thus the mobility of the ions. In order to provide the mobility of the ions in the correct units, the correlation is then scaled as known in the art by the ion mobility determination unit 105 according to reference standards.

In order to determine the mobility of the ions and in order to execute the method according to the invention in these conditions, the ion guide assembly 1 includes a control unit 2 adapted to control the ion guide assembly 1 such that the first travelling wave amplitude, the first travelling wave velocity, the second travelling wave amplitude and the second travelling wave velocity are chosen such that for each ion species of the at least N different ion species, the ratio A is larger than the ratio B. Thereby, the control unit 2 of the ion guide assembly 1 is controlled by the apparatus control unit 106 in order to control the ion guide assembly 1 for controlling the apparatus 101 to execute the method for determining the mobility of the ions.

Figure 3:
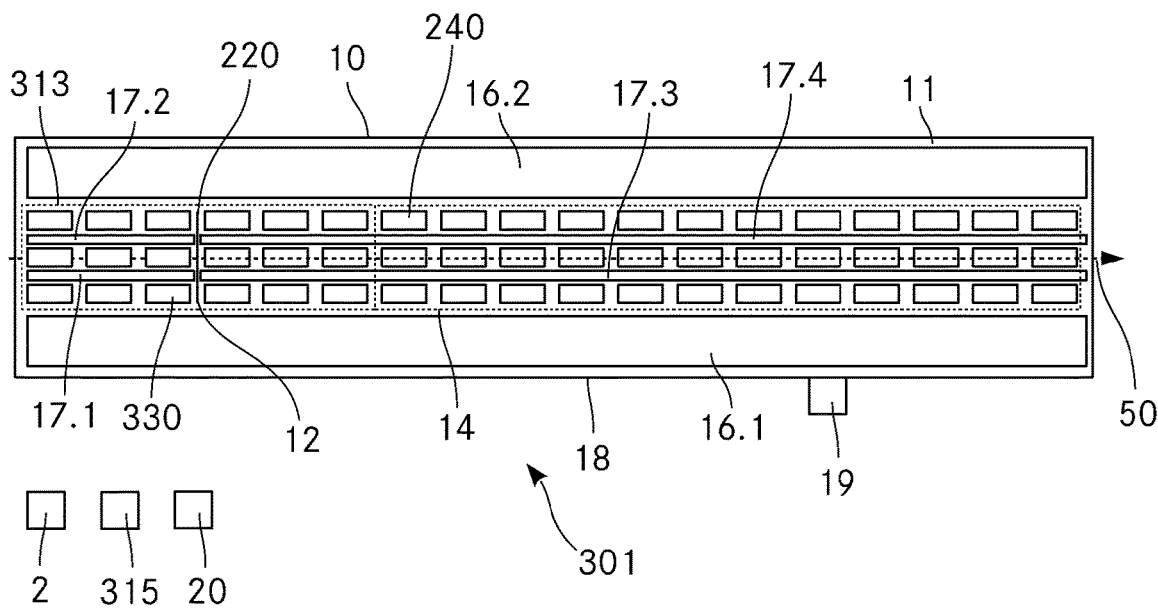

FIG. 3 shows a simplified schematic view of another ion guide assembly 301 according to the invention for executing the method according to the invention. This ion guide assembly 301 is to a large extend the same as the ion guide assembly 1 shown in FIG. 2. The elements of the ion guide assembly 301 shown in FIG. 3 which are the same as the ones of the ion guide assembly 1 of FIG. 2 are labelled with the same reference numbers. Elements which differ from the elements of the ion guide assembly 1 of FIG. 2 however are labelled with a different reference number.

In contrast to the ion guide assembly 1 shown in FIG. 2, the ion guide assembly 301 shown in FIG. 3 the conveying electrodes 330 of the first arrangement 313 of conveying electrodes 330 have a length of 2.0 mm measured along the ion guide path at a position of the respective conveying electrode 330 on the ion guide path. Thus, in the ion guide assembly 301 of FIG. 3, the length of the conveying electrodes 330 of the first arrangement 313 of conveying electrodes 330 measured along the ion guide path is the same as the length of the conveying electrodes 240 of the second arrangement 14 of conveying electrodes 240 measured along the ion guide path at a position of the respective conveying electrode 240 on the ion guide path. Furthermore, the gaps between the conveying electrodes 330 of the first arrangement 313 of conveying electrodes 330 have a length of 0.2 mm measured along the ion guide path at their respective position which is the same as the gaps between the conveying electrodes 240 of the second arrangement 14 of conveying electrodes 240. Furthermore, the AC voltage control circuitry 15 is adapted to apply AC voltages to the first arrangement 313 of conveying electrodes 330 which differ from the AC voltages applied to the second arrangement 14 of conveying electrodes 240 in that it has a frequency which is only 35 kHz and which is thus half of the frequency of the AC voltages applied to the second arrangement 14 of conveying electrodes 240. For this reason, the first travelling waves have the same wavelength as the second travelling waves but have a first travelling wave velocity which is half the second travelling wave velocity. Thus, the conditions experienced by the ions in the first section of the ion guide path and in the second section of the ion guide path are nearly the same as the ones experienced in the ion guide 10 of the ion guide assembly 1 shown in FIG. 2. However, in the ion guide 10 of the ion guide assembly 301 shown in FIG. 3, the slopes of the first travelling waves are less steep and, measured in millimeters, the first section of the ion guide path has double the length of the first section of the ion guide path of the ion guide assembly 1 shown in FIG. 2. Nonetheless, for each ion species of the at least N different ion species in the stream of ions in the ion guide 10 of the ion guide assembly 301 shown in FIG. 3, the ratio A is still larger than twice the ratio B.

The invention is not limited to the examples described above in the context of the Figures. Rather, many other variants and variations are readily available to the person skilled in the art for executing the invention.

In summary, it is to be noted that a method and an ion guide assembly are provided that enable modulating a stream of ions more precisely according to a modulation function in an ion guide.

The invention claimed is:

1. A method for, in an ion guide, modulating a stream of ions according to a modulation function, wherein said stream of ions includes at least N different ion species, wherein N is at least 1,
    wherein said ion guide forms an ion guide path, wherein said ions of said stream of ions are conveyed along said ion guide path in a conveying direction to form said stream of ions,
    wherein said ion guide includes an ion gate arranged at an ion gate position on said ion guide path, wherein said ion gate is adapted to provide an open state for allowing said ions passing said ion gate position when being conveyed along said ion guide path and a closed state for preventing said ions from passing said ion gate position, wherein said ion guide includes a first arrangement of conveying electrodes arranged along said ion guide path, said first arrangement of conveying electrodes extending over a first section of said ion guide path, wherein said first section of said ion guide path reaches from at least said ion gate position downstream to at least a transition position on said ion guide path, wherein said first arrangement of conveying electrodes is adapted for generating first travelling waves having a first travelling wave amplitude and travelling along said first section of said ion guide path at a first travelling wave velocity for conveying said ions along said first section of said ion guide path, wherein said ion guide includes a second arrangement of conveying electrodes arranged along said ion guide path, said second arrangement of conveying electrodes extending over a second section of said ion guide path, wherein said second section of said ion guide path reaches from said transition position downstream, wherein said second arrangement of conveying electrodes is adapted for generating second travelling waves having a second travelling wave amplitude and travelling along said second section of said ion guide path at a second travelling wave velocity for conveying said ions along said second section of said ion guide path, wherein according to the method, said stream of ions is modulated with said ion gate according to said modulation function and AC voltages are applied to said first arrangement of conveying electrodes for generating said first travelling waves and to said second arrangement of conveying electrodes for generating said second travelling waves for conveying said ions downstream of said ion gate along said first section and said second section of said ion guide path in said conveying direction away from said ion gate, wherein for each ion species of said at least N different ion species, a ratio A is the average velocity of the ions of the respective ion species in said first section of said ion guide path divided by said first travelling wave velocity, wherein for each ion species of said at least N different ion species, a ratio B is the average velocity of the ions of the respective ion species in said second section of said ion guide path divided by said second travelling wave velocity, wherein said first travelling wave amplitude, said first travelling wave velocity, said second travelling wave amplitude and said second travelling wave velocity are chosen such that for each ion species of said at least N different ion species, the ratio A is larger than the ratio B.

2. The method according to claim 1, wherein said first travelling wave amplitude, said first travelling wave velocity, said second travelling wave amplitude and said second travelling wave velocity are chosen such that for each ion species of said at least N different ion species, the ratio A is at least the ratio B multiplied by a factor of 1.1.

3. The method according to claim 1, wherein said second travelling wave velocity is higher than said first travelling wave velocity.

4. The method according to claim 1, wherein said first travelling wave amplitude and said first travelling wave velocity are chosen such that for each ion species of said at least N different ion species, the ions of the respective ion species are conveyed in said first section of said ion guide path at an average velocity which is higher than 70% of said first travelling wave velocity.

5. The method according to claim 1, wherein said ion guide is operated in a gas pressure in a range from 0.01 mbar to 1 bar, from 0.01 mbar to 100 mbar or from 0.01 mbar to 10 mbar.

6. The method according to claim 1, wherein N is at least 2.

7. The method according to claim 1, wherein said first travelling waves have a wavelength and said transition position is located at a distance of at least one wavelength of said first travelling waves downstream from said ion gate position on said ion guide path.

8. The method according to claim 7, wherein said first section of said ion guide path reaches from said ion gate position upstream to an entrance end of said first section of said ion guide path.

9. The method according to claim 8, wherein said first travelling waves have a wavelength and said entrance end of said first section of said ion guide path is located at a distance of at least one wavelength of said first travelling waves upstream from said ion gate position on said ion guide path.

10. A method for determining a mobility of ions, wherein a stream of ions is modulated according to a modulation function with the method according to claim 1 and subsequently passed through an ion mobility separation cell for separating said ions in said stream of ions according to their mobility, wherein said ions having passed said ion mobility separation cell are detected with an ion detector which provides a signal representing the detected ions and said mobility of said ions is determined based on said signal obtained from said ion detector.

11. The method according to claim 10, wherein the second section of said ion guide path passes through said ion mobility separation cell and said ions are separated according to their mobility when being conveyed along the second section of said ion guide path.

12. The method of claim 10, wherein said mobility of said ions is obtained by calculating a correlation of said modulation function and said signal obtained from said ion detector, wherein an autocorrelation of said modulation function is a two-valued function.

13. An ion guide assembly for modulating a stream of ions according to a modulation function with the method according to claim 1, wherein said stream of ions includes at least N different ion species, wherein N is at least 1, wherein said ion guide assembly includes an ion guide which forms an ion guide path, wherein said ions of said stream of ions are conveyable along said ion guide path in a conveying direction to form said stream of ions, a) wherein said ion guide includes an ion gate arranged at an ion gate position on said ion guide path, wherein said ion gate is adapted to provide an open state for allowing said ions passing said ion gate position when being conveyed along said ion guide path and a closed state for preventing said ions from passing said ion gate position, b) wherein said ion guide includes a first arrangement of conveying electrodes arranged along said ion guide path, said first arrangement of conveying electrodes extending over a first section of said ion guide path, wherein said first section of said ion guide path reaches from at least said ion gate position downstream to at least a transition position on said ion guide path, wherein said first arrangement of conveying electrodes is adapted for generating first travelling waves having a first travelling wave amplitude and travelling along said first section of said ion guide path at a first travelling wave velocity for conveying said ions along said first section of said ion guide path, c) wherein said ion guide includes a second arrangement of conveying electrodes arranged along said ion guide path, said second arrangement of conveying electrodes extending over a second section of said ion guide path, wherein said second section of said ion guide path reaches from said transition position downstream, wherein said second arrangement of conveying electrodes is adapted for generating second travelling waves having a second travelling wave amplitude and travelling along said second section of said ion guide path at a second travelling wave velocity for conveying said ions along said second section of said ion guide path, wherein said ion guide assembly includes at least one AC voltage control circuitry connectable to said first arrangement of conveying electrodes for supplying the conveying electrodes of said first arrangement of conveying electrodes with AC voltages for generating said first travelling waves for conveying said ions downstream of said ion gate along said first section of said ion guide path in said conveying direction away from said ion gate and connectable to said second arrangement of conveying electrodes for supplying the conveying electrodes of said second arrangement of conveying electrodes with AC voltages for generating said second travelling waves for conveying said ions along said second section of said ion guide path in said conveying direction away from said ion gate, wherein for each ion species of said at least N different ion species, a ratio A is the average velocity of the ions of the respective ion species in said first section of said ion guide path divided by said first travelling wave velocity, wherein for each ion species of said at least N different ion species, a ratio B is the average velocity of the ions of the respective ion species in said second section of said ion guide path divided by said second travelling wave velocity, wherein said ion guide assembly includes a control unit adapted to control the ion guide assembly such that said first travelling wave amplitude, said first travelling wave velocity, said second travelling wave amplitude and said second travelling wave velocity are chosen such that for each ion species of said at least N different ion species, the ratio A is larger than the ratio B.

14. The ion guide assembly according to claim 13, wherein said at least one AC voltage control circuitry is connected to said first arrangement of conveying electrodes for supplying the conveying electrodes of said first arrangement of conveying electrodes with AC voltages for generating said first travelling waves for conveying said ions downstream of said ion gate along said first section of said conveying path in said conveying direction away from said ion gate and connected to said second arrangement of conveying electrodes for supplying the conveying electrodes of said second arrangement of conveying electrodes with AC voltages for generating said second travelling waves for conveying said ions along said second section of said ion guide path in said conveying direction away from said ion gate.

15. An apparatus for determining a mobility of ions with the method according to claim 10, wherein said apparatus includes
a) an ion guide assembly according to claim 13 for modulating a stream of ions according to a modulation function,
b) an ion mobility separation cell for separating said ions in said stream of ions according to their mobility after said stream of ions is modulated according to said modulation function, and
c) an ion detector for detecting said ions after having passed said ion mobility separation cell and for providing a signal representing the detected ions and
d) an ion mobility determination unit for determining said mobility of said ions based on said signal obtained from said ion detector.

16. The method according to claim 1, wherein said first travelling wave amplitude, said first travelling wave velocity, said second travelling wave amplitude and said second travelling wave velocity are chosen such that for each ion species of said at least N different ion species, the ratio A is at least the ratio B multiplied by a factor of 2.

17. The method according to claim 1, wherein said ion guide is operated in a gas pressure in a range from 0.1 mbar to 1 bar, from 0.1 mbar to 100 mbar or from 0.1 mbar to 10 mbar.

18. The method according to claim 1, wherein said ion guide is operated in a gas pressure in a range from 1 mbar to 1 bar, from 1 mbar to 100 mbar or from 1 mbar to 10 mbar.

19. The method according to claim 1, wherein N is at least 5.

20. The method according to claim 1, wherein N is at least 10.

* * * * *